United States Patent [19]

Campana

[11] 4,114,863
[45] Sep. 19, 1978

[54] THERMAL TORCH AND METHOD

[76] Inventor: Patsie Carmen Campana, 2614 Sherwood Dr., Lorain, Ohio 44053

[21] Appl. No.: 776,582

[22] Filed: Mar. 11, 1977

[51] Int. Cl.² .......................................... B23K 27/00
[52] U.S. Cl. ................................................... 266/48
[58] Field of Search .................. 110/1 R; 148/9 R; 219/70, 75; 266/48; 431/99

[56] References Cited
U.S. PATENT DOCUMENTS 3,602,620  8/1971  Fässler ................................ 431/99

Primary Examiner—Roy Lake
Assistant Examiner—Paul A. Bell
Attorney, Agent, or Firm—Fay & Sharpe

[57] ABSTRACT

A new and improved thermal torch or lance and method for boring, cutting, burning and the like of hard base materials which facilitates concentrating and intensifying the thermic reaction thereof. The arrangement includes an elongated hollow inner sleeve or casing generally coextensively received within an elongated hollow outer sleeve or casing with the two casings being dimensioned so that a first gas flow passage is defined therebetween over the cooperative lengths thereof. At least one elongated rod is received within the inner casing in a manner defining at least one second gas flow passage over the cooperative lengths thereof. In operation oxygen is passed under pressure through the first and second passages from the torch inlet end to and outwardly from the torch discharge end. Oxygen passing outwardly from the second passage cooperates in the thermic reaction as is conventional in prior thermal torches. Oxygen passing outwardly from the first passage acts as a gas envelope surrounding the primary thermic reaction to thereby confine and intensify it.

10 Claims, 5 Drawing Figures

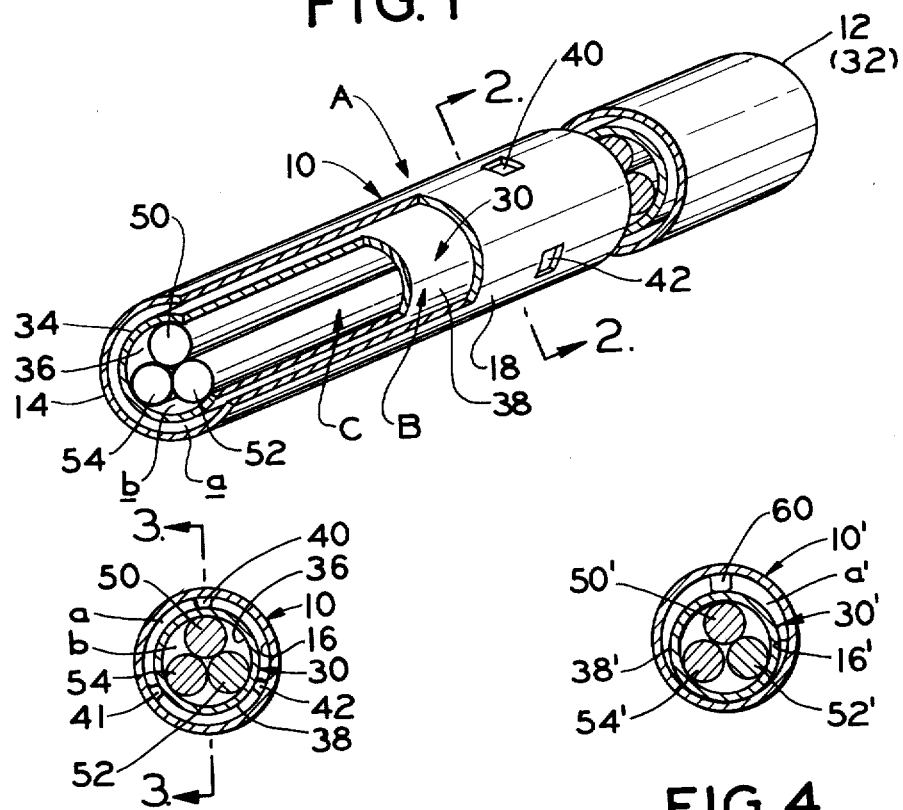
FIG. 1
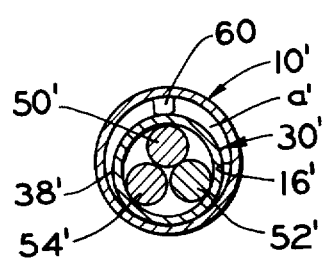
FIG. 2
FIG. 4
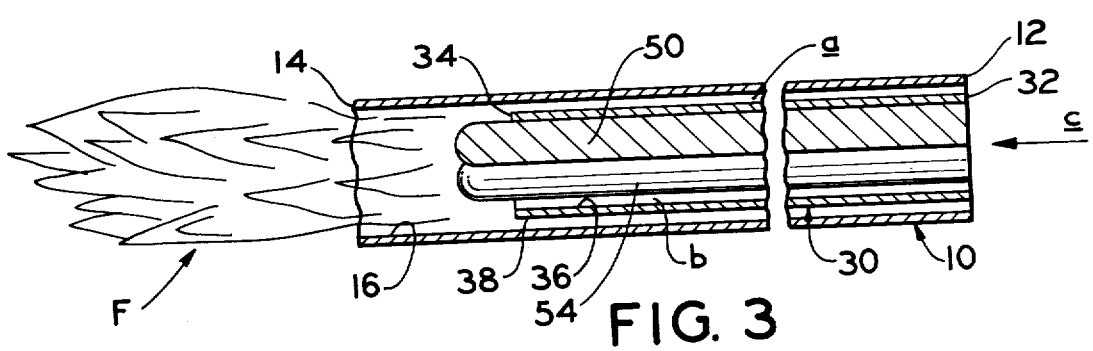
FIG. 3
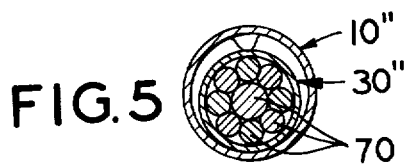
FIG. 5

THERMAL TORCH AND METHOD

BACKGROUND OF THE INVENTION

This application pertains to the art of thermal torches and more particularly to consumable thermal lanches or torches.

The invention is particularly applicable to an oxygen lance of the type typically employed for boring, cutting, burning and the like of hard base materials and will be described with particular reference thereto; however, it will be appreciated by those skilled in the art that the invention has broader applications and may be adapted to use in other environments and applications.

The oxygen lance and oxygen lance process represent one of the oldest commercial uses of oxygen for piercing and cutting holes in hard base materials including practically all ferrous metals and many other materials such as concrete, slag, rock and the like. Initially, such lances simply comprised an elongated length of black iron pipe connected at one end to an oxygen hose, regulator and cylinder or manifold so that only oxygen flowed through the lance pipe. In operation, and in order to initiate the thermic reaction of the lance, an area on the material to be treated is preheated to kindling temperature. The end of the lance is then brought against the heated area and the supply of oxygen then turned on. This then oxydizes the material to be treated with sufficient heat being produced to continue the cut or hole with oxygen alone without any additional heat or flame required to facilitate progress. The discharge end of the lance is held in the cut or hole so that the cutting oxygen stream emerges at the point of cutting or oxidation. This heats and burns the end of the pipe so that as the operation proceeds, the lance is consumed and must be replaced from time to time with a new length of iron pipe. Only a small portion of the oxygen consumed is required by the oxidation of the lance itself but the heat of the burning lance assists the cutting. Once started, the reaction is very vigorous so that a lot of "splatter" outwardly from and at the discharge end of the lance is normally associated with this process.

Until fairly recently, practically no development work had been done in the area of improving the basic oxygen lance constructions and cutting techniques as they remained substantially the same as when first developed. However, it had been previously noted that the cutting action could be increased by using a lance pipe having greater wall thickness or by inserting one or more steel rods into the pipe. The thicker pipe and rod inserts furnish both additional fuel and heat and the rods decrease the area of effective opening in the lance pipe so that the oxygen stream gains greater velocity as it travels through the lance. Thus, the eroding effect on the material being treated is increased. Such increase, in turn, increases the "splatter" problem as well as flame spreading so that the cutting action is not as concentrated as desired in order to realize the ultimate in cutting action.

Over the last 10 years or so, there have been renewed interests in oxygen lance techniques resulting in many purported improvements on and to the basic oxygen lance structure. Most of these improvements are directed to the areas of the manner of disposing one or more elongated rods within the outer lance casing, the mounting of the various component parts relative to each other, particular and specialized configurations for the outer casing and inner rods and particular cooperative relationships between the inner rods when received within the outer casing. Typical of such fairly recent patents are U.S. Pat. Nos. 3,260,076; 3,460,223; 3,487,791; 3,500,774; 3,507,230; 3,507,231; 3,570,419; 3,602,620; 3,738,288; and, 3,921,542. However, none of the various improvements, as exemplified by these various patents, focus upon or provide any solution for reducing the "splattering" problem or for reducing flame spreading to intensify the overall thermic reaction.

The present invention contemplates new and improved apparatus and method which overcome the above referred to problems and others and provides a new and improved thermal torch or lance and method which is fairly simple in design, simple to manufacture, economical to use, confines and intensifies the thermic reaction and which is readily adapted to use in a plurality of boring, cutting, burning and the like operations of hard base materials in different environments.

BRIEF DESCRIPTION OF THE PRESENT INVENTION

In accordance with the present invention, a new and improved consumable thermal torch or lance for boring, cutting, burning and the like of hard base materials is provided. The torch comprises an elongated open ended hollow outer casing having inlet and discharge ends and an elongated open ended hollow inner casing also having inlet and discharge ends. The inner casing is received and positively located within the outer casing so that the inlet and discharge ends of the two casings are generally coextensive with each other. The outside cross-sectional dimension of the inner casing is less than the inside cross-sectional dimension of the outer casing to define a gas flow passage therebetween over the cooperative lengths thereof between the inlet and discharge ends. At least one elongated burning rod is received within the casing and extends generally coextensive therewith between the inlet and discharge ends thereof. This at least one rod has an outer cross-sectional dimension less than the inner cross-sectional dimension of the inner casing to thereby define at least one second gas flow passage therebetween over the cooperative lengths thereof.

In accordance with another aspect of the present invention, the first passage has an average thickness in the range of approximately 0.23–0.032 inch.

In accordance with another aspect of the present invention, at least the inner and outer casings are positively retained in position relative to each other by a plurality of detents extending inwardly from the outer casing toward engagement with the inner casing with these detents included at spaced intervals along the cooperative lengths of the two casings.

In accordance with yet another aspect of the present invention, the at least one rod comprises a plurality of such rods disposed in a close spaced relationship with each other and forming a plurality of second gas flow passages.

In accordance with a still further aspect of the present invention, there is provided a method for improving the thermic reaction at the discharge end of a thermal torch of the type employed for boring, cutting, burning and the like of hard base materials and wherein the lance includes a first elongated hollow casing having inlet and discharge ends and at least one burning rod member extending therethrough generally coextensively therewith and dimensioned to define a first gas flow passage therebetween over the cooperative lengths thereof.

The method of the invention comprises the steps of:
(a) defining a second gas flow passage around at least a portion of the first casing;
(b) providing a second gas flow passage with a gas flow entrance area and a gas flow exit area with the gas flow exit area disposed adjacent the first casing discharge end; and,
(c) continuously introducing a gas flow into the entrance area to continuously exit from the exit area during operation of the torch for forming a gas curtain around the torch discharge end which flows generally axially of the torch thereby confining and intensifying the thermic reaction thereof.

The principal object of the present invention is the provision of a new and improved thermal torch and method which provide an improved thermal reaction over prior known thermal lances and methods.

Another object of the present invention is the provision of a new and improved thermal torch and method which are simple in design and easy to use in practical applications.

Yet a further object of the present invention is the provision of a new and improved thermal torch and method readily adaptable to use for thermal torch applications in many different environments.

BRIEF DESCRIPTION OF THE DRAWINGS

The invention may take physical form in certain parts and arrangements of parts, a preferred and alternative embodiments of which will be described in detail in the specification and illustrated in the accompanying drawings which form a part hereof and wherein:

FIG. 1 is a perspective view in partial cross-section, for ease of illustration, of a thermal lance or torch constructed in accordance with the subject invention;

FIG. 2 is a cross-sectional view taken along lines 2—2 of FIG. 1;

FIG. 3 is a longitudinal cross-sectional view of the thermal torch or lance shown in FIG. 1 when it has been placed into operation showing confinement of the flame generated thereby to intensify the thermic reaction achieved;

FIG. 4 is a view similar to FIG. 2 showing a slightly modified structural arrangement thereof; and, FIG. 5 is an alternative structure to that shown in FIG. 4.

DESCRIPTION OF THE PREFERRED EMBODIMENT

Referring now to the drawings wherein the showings are for purposes of illustrating the preferred and some alternative embodiments of the invention only and not for purposes of limiting same, the FIGURES show a thermal torch or lance comprised of an outer sleeve or casing A, an inner sleeve or casing B and a plurality of burning rods C.

More particularly and with reference to FIGS. 1-3, outer casing A is comprised of an elongated cylindrical body generally designated 10 having an inlet or entrance end 12 and a discharge end 14. The side wall of body 10 includes an inner surface 16 and an outer surface 18. Preferably, body 10 is comprised of conventional black iron pipe and has a cylindrical configuration with the length between ends 12,14 being anywhere from 6 to 12 feet.

Inner casing B is comprised of an elongated body 30 having an inlet or entrance end 32 and a discharge end 34. The side wall of body 30 includes an inner surface 36 and an outer surface 38. As with elongated body 10, body 30 is constructed from conventional black iron pipe and may have an overall length of anywhere from 6 to 12 feet.

As best shown in FIGS. 1-3, elongated bodies 10,30 are dimensioned so that body 30 may be received within body 10 with a gas flow passage $a$ defined between inner surface 16 of body 10 and outer surface 38 of body 10. In the arrangement here under discussion, the two bodies are generally coaxially disposed with passage $a$ thus having an annular configuration. It is preferred that gas flow passage $a$ has a thickness in the range of approximately 0.023-0.032 inch as it has been found that this particular dimensional relationship provides particularly advantageous operational results which will be described in greater detail hereinafter.

In order to maintain outer and inner sleeves or casings A and B in the positively located position generally coextensive and coaxial with each other, a plurality of detent sets are conveniently employed at spaced intervals axially along the lance or torch structure. As particularly shown in FIGS. 1 and 2, one of these sets is shown and is comprised of individual detents 40,42 and 44 equidistantly spaced apart from each other circumferentially around the lance. These detents extend inwardly from outer casing A into positive engagement with inner casing B and may be conveniently made by conventional metal working techniques so that inner surface 16 of elongated body 10 is forced into positive engagement with outer surface 38 of elongated body 30 at the detent areas. Since the detents of each set as exemplified by detents 40,42 and 44 are equidistantly spaced apart circumferentially around the lance or torch, the inner and outer casing will be coaxially disposed relative to each other. Additional detent sets are conveniently included at axially spaced intervals along the torch or lance structure with the number and distance between such intervals being determined by the overall length and sizes of the casings A,B themselves. It is necessary to include sufficient detent sets so that the inner and outer casings will be retained in position relative to each other as the lance is consumed during use thereof. It is possible to use other combinations of detents and/or other means entirely for mounting the inner and outer casings together and such modifications are deemed to come within at least the broadest concepts of the subject invention.

A plurality of solid burning rods 50,52 and 54 are closely received within inner casing B and disposed so as to extend generally coextensive therewith. In FIGS. 1-3, and while three such rods are shown, a greater or lesser number of rods could also be advantageously employed without in any way departing from the intent or scope of the present invention. Rods 50,52 and 54 are preferably constructed from mild steel and are dimensioned so that when all three are placed into the inner sleeve or casing, they will be closely retained therein by engagement with each other and with inner surface 36 of elongated body 30. In the event that an alternative configuration for these rods is desired or in the event they are not closely and retainingly received within inner casing B, means similar to the detents discussed in detail hereinabove could also be advantageously employed for retention purposes. When rods 50,52 and 54 are so received within inner sleeve B, a plurality of second gas flow passages *b* are defined between inner surface 36 and the rods as well as between the rods themselves.

With particular reference to FIGS. 3, description will hereinafter be made to operation of the thermal torch or lance hereinabove previously described. In use, the inlet or entrance end of the torch as defined at ends 12,32 of casings A,B is affixed by convenient means (not shown) to a source (not shown) of oxygen as is conventional. Typically, this connection merely comprises a valve arrangement connected to an oxygen hose, regulator and cylinder or manifold so that oxygen may flow through gas flow passages *a,b*. As the specific hookup is deemed to be conventional and already known in the art and further, since it does not form a specific part of the present invention, a detailed description thereof is deemed unnecessary.

In any event, and with oxyyen flowing in direction *c*, through gas flow passages *a,b* toward the discharge end of the torch or lance as defined by ends 14,34 of casings A,B, the lance or torch is ignited by conventionally known means. Once ignited, combustion is self supporting through the supply of oxygen so that a flame F is directed axially outward at the discharge end of the torch or lance onto the material being cut or otherwise processed. This flame acts to perform the boring, cutting, burning and the like action desired and during such action, the entire lance structure is consumed from the discharge end toward the inlet end. According to the concepts of the subject invention, oxygen flowing through gas flow passages *b* in conjunction with elongated body 30 and rods 50,52,54 provide the primary thermic reaction for the desired boring, cutting, burning and the like. Because the primary thermic reaction is centered at this point, these particular structural components will be consumed at a slightly faster rate (FIG. 3) than will outer casing A as defined by elongated body 10. Oxygen flowing through gas flow passage *a* exits axially outward from the discharge end of the torch to provide a gas curtain around the primary thermic reaction. The effect of this curtain is enhanced by the fact that outer casing A is not consumed as fast as the remainder of the inner structural components so that the gas curtain remains in tact and does not spread outwardly from the torch or lance at the point of the primary thermic reaction. The gas curtain confines flame F and forms it into a bullet-like configuration as shown in FIG. 3 which results in an intensifying action of the flame to enhance and improve the thermic reaction. Further, and due to the fact that flame F is confined and configured into a bullet-like structure, the thermic reaction is concentrated so as to substantially eliminate "splattering" as has heretofore been the case with prior known thermal torches or lances.

By way of specific example, it has been found that the best and most efficient burn or thermic reaction will occur at 90 to 100 psi gauge pressure of oxygen introduced at the inlet end of the torch into gas flow passages *a,b*. The corresponding oxygen pressures developed at the discharge end of the torch for these pressures are approximately 124 and 140 psi respectively, and are deemed optimal when combined with the amount of metal being consumed so that the burn is steady and extremely efficient.

The above noted specific pressures allow the torch to burn freely in free air, cut deep and narrow paths very quickly and provide the best bullet-like effect for the lance. Work is accomplished faster because the thermal torch melts the workpiece faster, more precisely and blows molten waste out of the work area easier because of the discharge or tip pressures being developed. At 90 psi gauge pressure, the center portion of the lance as defined by elongated body 30 and rods 50,52,54 will burn back approximately one-half inch from outer casing A as defined by elongated body 10 and at 100 psi gauge pressure, it will burn back at from three-fourths inch to 1 inch. At these points, the inner portion of the lance which is feeding the flow of metal is shielded by the oxygen curtain and being directed centrally into the work area. If the inner portion does not burn back far enough, the torch can lose efficiency because of "splatter" outwardly of the side walls and if the oxygen pressure is too high, the center portion will burn back too far and the flow will be less efficient. The oxygen curtain is very important to the overall operation of the subject invention and it has been found that it is most effective when the average thickness of gap *a* is in the range of approximately 0.023–0.032 inch.

FIG. 4 shows a slight modification to the structure hereinabove described in detail with reference to FIGS. 1–3. For convenience and ease of appreciation of this modification, like components are identified by like numerals with a primed (') suffix and new components are identified by new numerals. Accordingly, the only difference in the arrangement of FIG. 4 and the arrangement of FIG. 2 is in the relative disposition between the outer and inner casings as defined by elongated bodies 10',30'. In FIG. 4, elongated bodies 10',30' are not disposed in a coaxial relationship but rather, are disposed so that outer surface 38' of body 30' is in line contact with inner surface 16' of elongated body 10' over the cooperative lengths thereof. In order to retain the two casings in this particular position, a plurality of detents 60 are disposed at axially spaced intervals along the outer casing. Since only one such detent is employed at each axially spaced interval, the natural tendency thereof is to force the inner casing toward line engagement with the inner surface of the outer casing opposite from the detent itself. Detents 60 may be made by conventional metal working techniques similar to detents 40,42 and 44 as outlined above with regard to the embodiment of FIGS. 1–3.

The FIG. 4 arrangement is deemed advantageous in that it facilitates ease of assembly for the overall torch or lance structure. While gas flow passage *a'* is generally crescent shaped and does not entirely encircle the area of primary thermic reaction, it has been found that a sufficient area is nevertheless surrounded so that there is no loss in burning efficiency from the FIGS. 1–3 arrangement discussed above in detail. Moreover, and since the relative sizes of outer and inner casings A,B are the same as the FIGS. 1–3 embodiment, the average thickness of gas flow passage *a'* will be in the preferred range of 0.023–0.032 inch.

Finally, FIG. 5 shows an arrangement substantially similar to that hereinabove just described with reference to FIG. 4 except for modification to the arrangement and number of inner rods which are employed. For ease of illustration in appreciating this modification, like components are identified by like numerals and include a double primed (") suffix and new components are identified by new numerals. In FIG. 5, rods 50,52 and 54 have been replaced by a plurality of smaller burning rods generally designated 70 and nine such rods 70 are specifically shown with the center one of these rods being slightly larger than the other eight. However, it is entirely possible and within the scope and intent of the present invention to have these rods all be of the same diameter and/or to use a greater or lesser number thereof.

Indeed, in some instances it has been found that a single internal rod totally suffices and in such instances, that rod could be coextensively positioned and retained in elongated bodies 30,30' or 30" by detents similar to those employed as between bodies 10 and 30, 10' and 30' and or 10" and 30". Still further, it would also be possible to employ materials other than the black iron pipe specifically mentioned above, modify the cross-sectional configurations of casings A and B and rods C from that specifically shown and described for retaining the various components in a desired position relative to each other. None of these modifications, however, are deemed to depart from the overall intent or scope of the present invention.

The invention has been described with reference to the preferred and alternative embodiments. Obviously, modifications and alterations will occur to others upon the reading and understanding of this specification. It is my intention to include all such modifications and alterations insofar as they come within the scope of the appended claims or the equivalents thereof.

Having thus described my invention, I now claim:

1. A consumable thermal torch for boring, cutting, burning and the like of hard base materials, said torch comprising: an elongated open ended hollow outer casing having an inlet end, a discharge end and a generally smooth inner wall; an elongated open ended hollow inner casing having an inlet end, a discharge end and a generally smooth outer wall, the outside cross-sectional dimension of said inner casing being less than the inside cross-sectional dimension of said outer casing with said inner casing being received within said outer casing; means for affixing said inner and outer casings together such that the inlet and discharge ends of said inner and outer casings are generally coextensive with each other with a first gas flow passage defined between the outer surface of said inner casing and the inner surface of said outer casing over the cooperative lengths thereof between said inlet and discharge ends, said first gas flow passage at least substantially surrounding said inner casing in a continuous manner; at least one elongated burning rod received within said inner casing extending generally coextensive therewith between the inlet and discharge ends thereof, said at least one rod having an outer cross-sectional dimension less than the inner cross-sectional dimension of said inner casing such that at least one second gas flow passage is created therebetween over the cooperative lengths thereof; and, said first gas flow passage generating a cas curtain which selectively flows longitudinally outward thereof at said inner and outer casing discharge ends from a gas flow introduced under pressure into at least said first gas flow passage adjacent said inner and outer casing inlet ends at least during torch operation, said gas curtain at least substantially surrounding said inner casing discharge end in a continuous manner for confining and concentrating a thermic action of said burning rod at said inner casing discharge end.

2. The thermal torch as defined in claim 1 wherein said affixing means comprises a plurality of separate detents extending inwardly from said outer casing toward engagement with said inner casing, said detents being disposed at spaced intervals along the cooperative lengths of said inner and outer casings.

3. The thermal torch as defined in claim 1 wherein both of said inner and outer casings have smooth walled cylindrical configurations with said inner casing coaxially disposed in said outer casing, said first gas flow passage having a substantially annular configuration for allowing said gas curtain to entirely surround said inner casing discharge end.

4. The thermal torch as defined in claim 1 wherein said at least one rod comprises a plurality of rods disposed in a side by side relationship and forming a plurality of second gas flow passages.

5. In a thermal torch of the type employed for boring, cutting, burning and the like of hard base materials wherein said torch includes a first smooth outer walled elongated hollow casing having inlet and discharge ends and at least one burning rod member extending therethrough generally coextensive therewith between said inlet and discharge ends with at least one first gas flow passage provided between said at least one rod and first casing longitudinally over the coextensive lengths thereof and wherein a gas flow is selectively introduced under pressure into said first gas flow passage at least adjacent said first casing inlet end for promoting a thermic action for said lance in said at least one rod and first casing at said first casing discharge end, the improvement comprising:

a second smooth inner walled elongated hollow casing having inlet and discharge ends received over said first casing in a surrounding relationship therewith, said second casing including means for fixedly mounting it relative to said first casing such that the inlet and discharge ends of said casings are generally coextensive with each other, said second casing further having an inner cross-sectional dimension greater than the outer cross-sectional dimension of said first casing such that a second gas flow passage is defined therebetween generally longitudinally over the cooperative lengths thereof and which second gas flow passage at least substantially surrounds said first casing in a continuous manner, said second gas flow passage being operably connected to said gas flow for generating a gas curtain flowing axially outward of said lance at said first and second casing discharge ends to substantially surround the first casing discharge end in a continuous manner for confining and intensifying the thermic action of said lance at said one rod and first casing discharge end.

6. The improvement as defined in claim 5 wherein said first casing is generally coaxially disposed within said second casing such that said second gas flow passage entirely surrounds said first casing for having said gas curtain entirely surround said first casing discharge end in a continuous manner.

7. A consumable thermal torch for boring, cutting, burning and the like of hard base materials, said torch comprising: an elongated open ended hollow outer casing having an inlet end, a discharge end and a predetermined inner cross-sectional dimension; an elongated open ended hollow inner casing having an inlet end, a discharge end and a predetermined outer cross-sectional dimension which is less than said outer casing inner cross-sectional dimension, said inner casing being received within said outer casing in a manner such that the inlet and discharge ends of said inner and outer casings are generally coextensive with each other and such that a portion of the outer surface of said inner casing engages a portion of the inner surface of said outer casing over the cooperative lengths thereof for defining a first gas flow passage between the outer surface of said inner casing and the inner surface of said outer casing between said inlet and discharge ends; and, at least one elongated burning rod received within said inner casing extending generally coextensive therewith between the inlet and discharge ends thereof, said at least one rod having an outer cross-sectional dimension less than the inner cross-sectional dimension of said inner casing such that at least one second gas flow passage is defined therebetween.

8. The thermal torch as defined in claim 5 wherein both said inner and outer casings have cylindrical configurations, said inner casing outer surface being in line contact with said outer casing inner surface over the cooperative lengths thereof and retained in that position by a plurality of detents extending inwardly from said outer casing toward engagement with said inner casing over the cooperative lengths thereof and wherein said first gas flow passage has a generally crescent-like configuration.

9. In a thermal torch of the type employed for boring, cutting, burning and the like of hard base materials wherein said torch includes a first elongated hollow casing having inlet and discharge ends and at least one burning rod member extending therethrough generally coextensive therewith between said inlet and discharge ends and wherein at least one first gas flow passage is provided between said at least one rod and first casing longitudinally over the cooperative lengths thereof, the improvement comprising:

a second elongated hollow casing having inlet and discharge ends received over said first casing and fixedly positioned thereto such that the inlet and discharge ends of said casing are generally coextensive with each other, said second hollow casing having an inner cross-sectional dimension greater than the outer cross-sectional dimension of said first casing with said casings disposed relative to each other such that a portion of the outer surface of said first casing engages a portion of the inner surface of said second casing over the cooperative lengths thereof for defining a second gas flow passage therebetween, said second gas flow passage adapted to facilitate the provision of a gas curtain at the discharge end of said torch during operation thereof for intensifying the thermic action of said lance.

10. The improvement as defined in claim 9 wherein said first and second casings are retained in position relative to each other by a plurality of axially spaced apart detents extending inwardly from said second casing toward engagement with said first casing over the cooperative lengths thereof in a manner such that said first casing is placed into line contact with said second casing.

* * * * *